(12) United States Patent
Welter et al.

(10) Patent No.: US 9,387,737 B2
(45) Date of Patent: Jul. 12, 2016

(54) PASSAGE TUBE FOR AIR MAINTENANCE TIRE

(71) Applicant: The Goodyear Tire & Rubber Company, Akron, OH (US)

(72) Inventors: Carolin Anna Welter, Schleich (DE); Dinesh Chandra, Stow, OH (US); Robert Leon Benedict, Tallmadge, OH (US); Robin Lamgaday, Wadsworth, OH (US); Cheng-Hsiung Lin, Hudson, OH (US); Thulasiram Gobinath, Hudson, OH (US); Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 139 days.

(21) Appl. No.: 14/453,986

(22) Filed: Aug. 7, 2014

(65) Prior Publication Data

US 2016/0039258 A1    Feb. 11, 2016

(51) Int. Cl.
*B60C 23/12* (2006.01)
*B60C 23/00* (2006.01)

(52) U.S. Cl.
CPC ............... *B60C 23/12* (2013.01); *B60C 23/001* (2013.01)

(58) Field of Classification Search
CPC ...... B60C 23/10; B60C 23/12; B60C 23/001; B60C 29/00; B60C 29/04
See application file for complete search history.

(56) References Cited

U.S. PATENT DOCUMENTS

| 3,304,981 | A  | * | 2/1967 | Sheppard | B60C 5/00 152/426 |
| 8,042,586 | B2 | * | 10/2011 | Losey | B60C 23/12 152/415 |
| 8,113,254 | B2 | * | 2/2012 | Benedict | B60C 23/12 152/419 |
| 8,235,081 | B2 | * | 8/2012 | Delgado | B60C 23/12 152/415 |
| 8,701,726 | B2 |   | 4/2014 | Hinque | |
| 8,857,484 | B2 |   | 10/2014 | Hinque | |
| 2013/0048177 | A1 |   | 2/2013 | Hinque | |
| 2013/0160916 | A1 | * | 6/2013 | Hinque | B60C 23/12 152/548 |
| 2013/0160927 | A1 | * | 6/2013 | Hinque | B29D 30/0061 156/110.1 |

FOREIGN PATENT DOCUMENTS

EP    2740616 A1    6/2014
EP    2842776 A1    3/2015

OTHER PUBLICATIONS

European Search Report dated Nov. 24, 2015 for Application Serial No. EP15179489.

* cited by examiner

*Primary Examiner* — Kip T Kotter
(74) *Attorney, Agent, or Firm* — John D. DeLong

(57) ABSTRACT

A tire assembly having: a tire having a tread portion and a pair of sidewalls extending radially inward from the tread portion to join with a respective bead; a supporting carcass for the tread portion and sidewalls; a pump passageway positioned within a bending region of the tire, the pump passageway being operative to open and close as the tire rotates; a valve assembly in fluid communication with the pump passageway; a pocket formed in the tire; a filter assembly mounted in the pocket, said filter assembly being in air flow communication with the valve assembly, wherein the pocket has an area larger than the area of the filter housing wherein the valve assembly has an inlet, wherein the filter assembly has an outlet, wherein a tube connects the filter outlet assembly to the inlet of the valve assembly; wherein the tube is made of a rubber composition having a shore D hardness greater than 40 as measured by ASTM-D2240.

17 Claims, 10 Drawing Sheets

PASSAGE TUBE FOR AIR MAINTENANCE TIRE

FIELD OF THE INVENTION

The invention relates generally to tires and more specifically, to an air maintenance assembly for a tire.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will maintain correct air pressure within the tire without a need for driver intervention to compensate for any reduction in tire pressure over time. It is useful to incorporate a filter in the design of an air maintenance tire system, so that the outside air is filtered before entering the system. The filter must be secured to the tire, and be able to sustain rotational forces. The filter must also be designed in such a way to minimize the stresses in the tire and allow for ease of assembly.

SUMMARY OF THE INVENTION

The present invention is directed to a tire assembly having: a tire having a tread portion and a pair of sidewalls extending radially inward from the tread portion to join with a respective bead; a supporting carcass for the tread portion and sidewalls; a pump passageway positioned within a bending region of the tire, the pump passageway being operative to open and close as the tire rotates; a valve assembly in fluid communication with the pump passageway; a pocket formed in the tire; a filter assembly mounted in the pocket, said filter assembly being in air flow communication with the valve assembly, wherein the pocket has an area larger than the area of the filter housing wherein the valve assembly has an inlet, wherein the filter assembly has an outlet, wherein a tube connects the filter outlet assembly to the inlet of the valve assembly; wherein the tube is made of a rubber composition having a shore D hardness greater than 40 as measured by ASTM-D2240.

BRIEF DESCRIPTION OF THE DRAWINGS

The invention will be described by way of example and with reference to the accompanying drawings in which.

DETAILED DESCRIPTION OF THE INVENTION

There is disclosed a tire assembly having: a tire having a tread portion and a pair of sidewalls extending radially inward from the tread portion to join with a respective bead; a supporting carcass for the tread portion and sidewalls; a pump passageway positioned within a bending region of the tire, the pump passageway being operative to open and close as the tire rotates; a valve assembly in fluid communication with the pump passageway; a pocket formed in the tire; a filter assembly mounted in the pocket, said filter assembly being in air flow communication with the valve assembly, wherein the pocket has an area larger than the area of the filter housing wherein the valve assembly has an inlet, wherein the filter assembly has an outlet, wherein a tube connects the filter outlet assembly to the inlet of the valve assembly; wherein the tube is made of a rubber composition having a shore D hardness greater than 40 as measured by ASTM-D2240.

Figure 1:
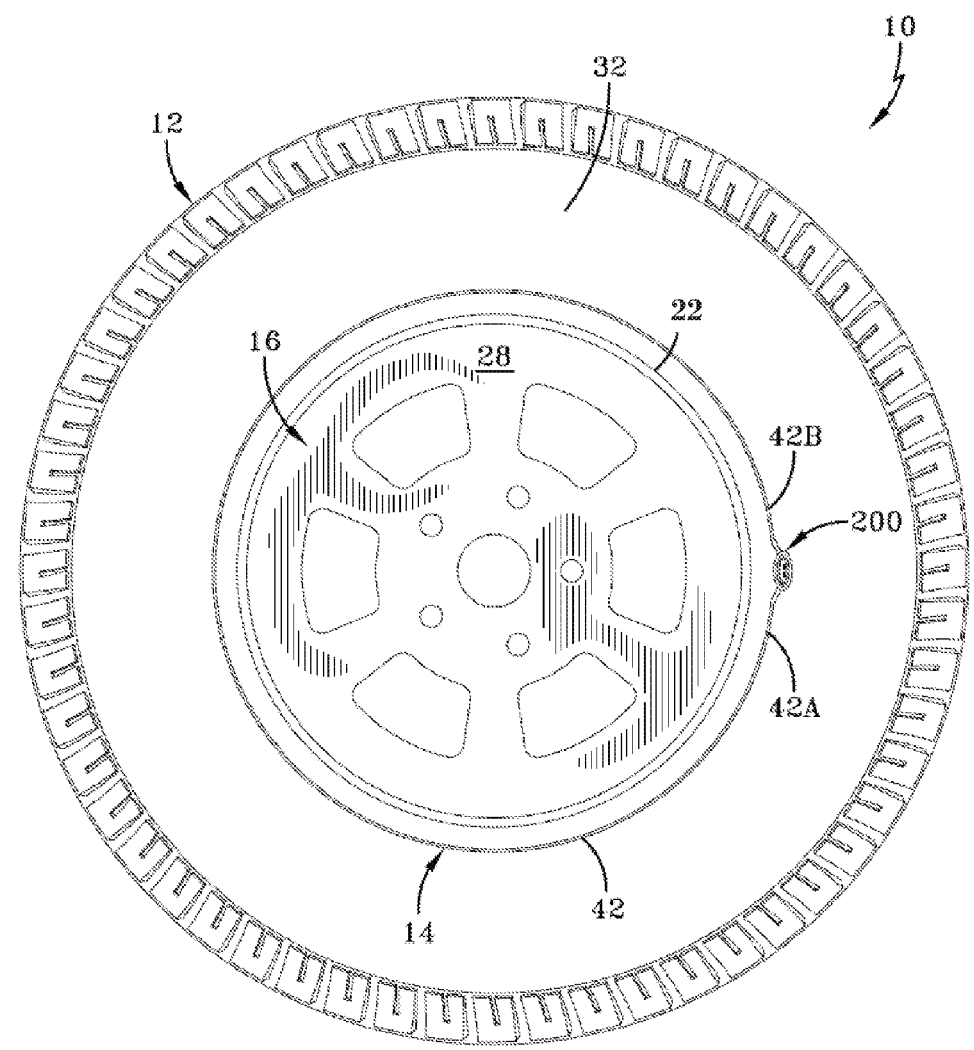
FIG. 1 is a front view of tire and rim assembly with a pump, valve and filter assembly.
Figure 2:
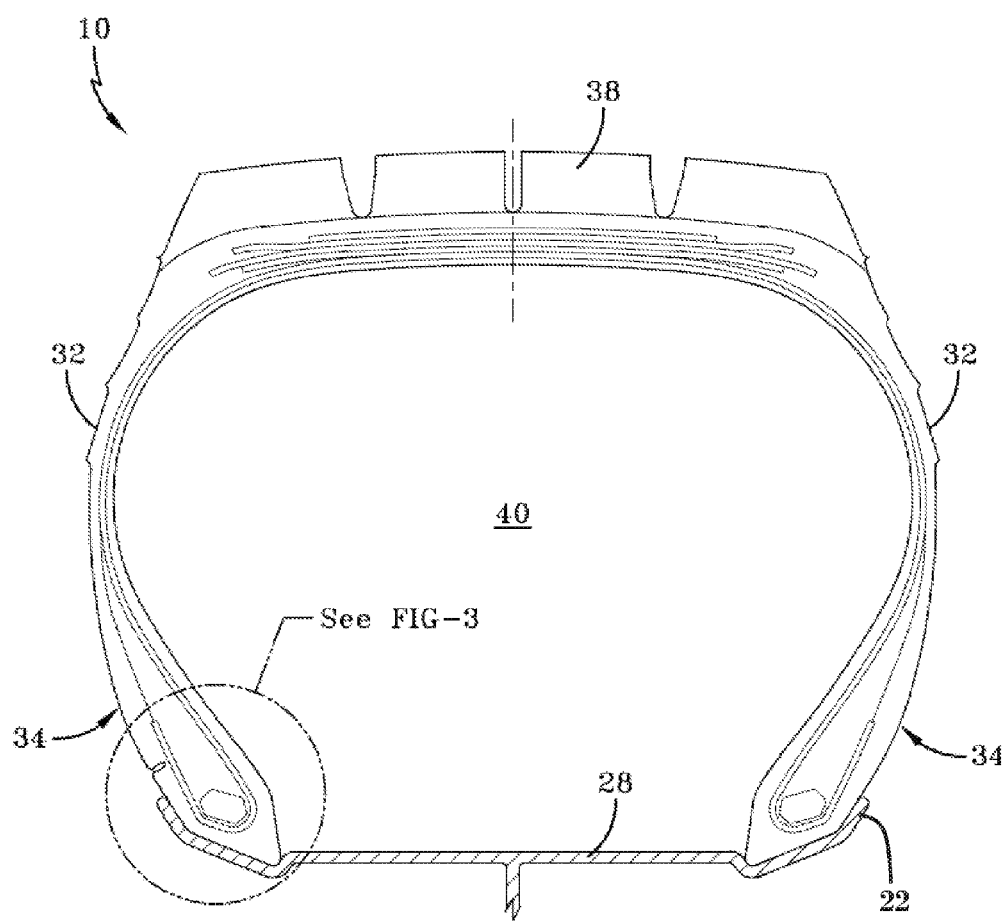
FIG. 2 is a cross sectional view of a truck tire having a groove in the bead area of the tire.

Referring to FIGS. 1 and 2, a tire assembly 10 includes a tire 12 and a pump assembly 14. The tire mounts in a conventional fashion to a wheel 16 having outer rim flanges 22. An annular rim body 28 joins the rim flanges 22 and supports the tire assembly as shown. The tire is of conventional construction, having a pair of sidewalls 32 extending from opposite bead areas 34 to a crown or tire tread region 38. The tire and rim enclose an interior tire cavity 40 which is filled with air.

Figure 3:
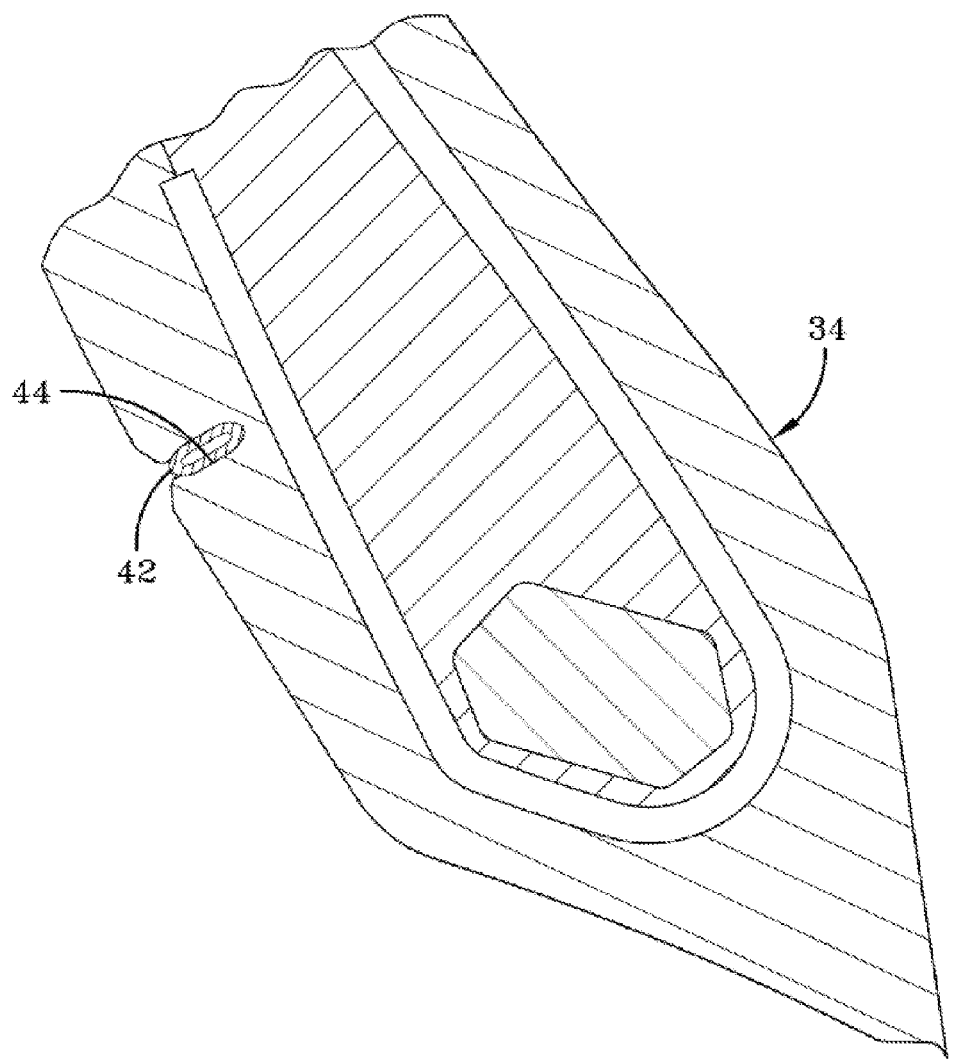
FIG. 3 is a close up cross-sectional view of the truck tire bead area of FIG. 2 illustrating the pump passageway.

As shown in FIGS. 1 and 3, the tire assembly includes a pump 14 having a pump passageway 42 that is mounted or located in the tire in a channel 44, preferably near the bead region 34 of the sidewall. The pump passageway 42 may be formed of a discrete tube made of a resilient, flexible material such as plastic, elastomer or rubber compounds, and is capable of withstanding repeated deformation cycles when the tube is deformed into a flattened condition subject to external force and, upon removal of such force, returns to an original condition. The tube is of a diameter sufficient to operatively pass a volume of air sufficient for the purposes described herein and allowing a positioning of the tube in an operable location within the tire assembly as will be described. Preferably, the tube has an elliptical cross-sectional shape, although other shapes such as round may be utilized.

The pump passageway itself may also be integrally formed or molded into the sidewall of the tire during vulcanization, eliminating the need for an inserted tube. An integrally formed pump passageway is preferably made by building into a selected green tire component such as a chafer, a removable strip made of wire or silicone. The component is built into the tire and cured. The removable strip is then removed post cure to form a molded in or integrally formed pump air passageway.

Hereinafter, the term "pump passageway" refers either to installed tubes or an integrally molded in passageway. The location selected for the pump passageway within the tire may be within a tire component residing within a high flex region of the tire, sufficient to progressively collapse the internal hollow air passageway as the tire rotates under load thereby conveying air along the air passageway from the inlet to the pump outlet.

Figure 6:
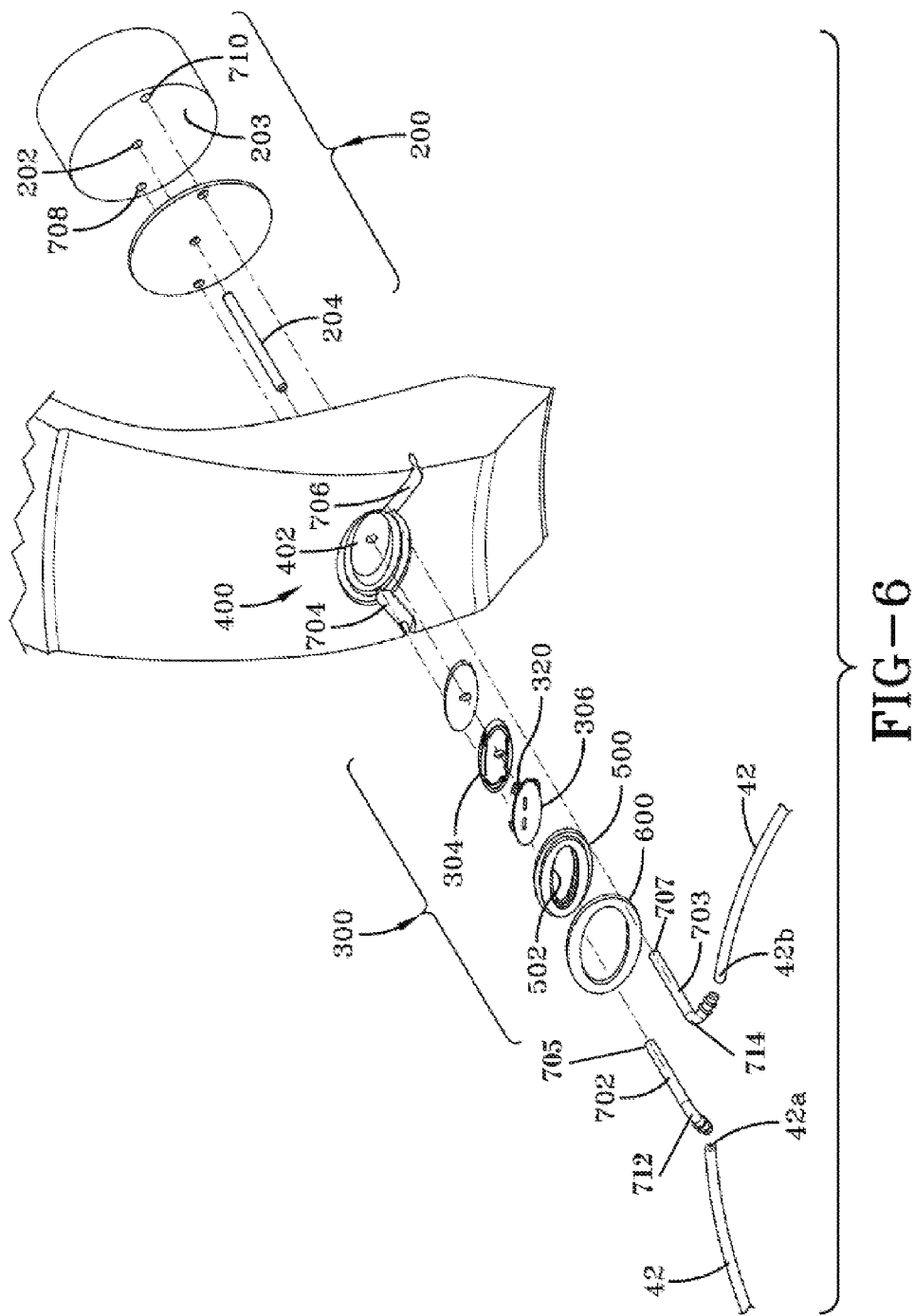
FIG. 6 is an exploded view of a filter assembly, regulator and tire bead area.

The pump air passageway 42 has an inlet end 42a and an outlet end 42b joined together by a valve system 200, as shown in FIGS. 1, 6. Examples of pressure regulators or valve systems suitable for use with the invention are disclosed in U.S. application Ser. Nos. 13/221,231, 13/221,433 and 13/221,506 and are hereby incorporated by reference. As shown in this particular example, the inlet end 42a and the outlet end 42b are spaced apart approximately 360 degrees forming an annular pump assembly. However, the inlet and outlet ends may be spaced apart 90°, 180°, etc.

Figure 7:
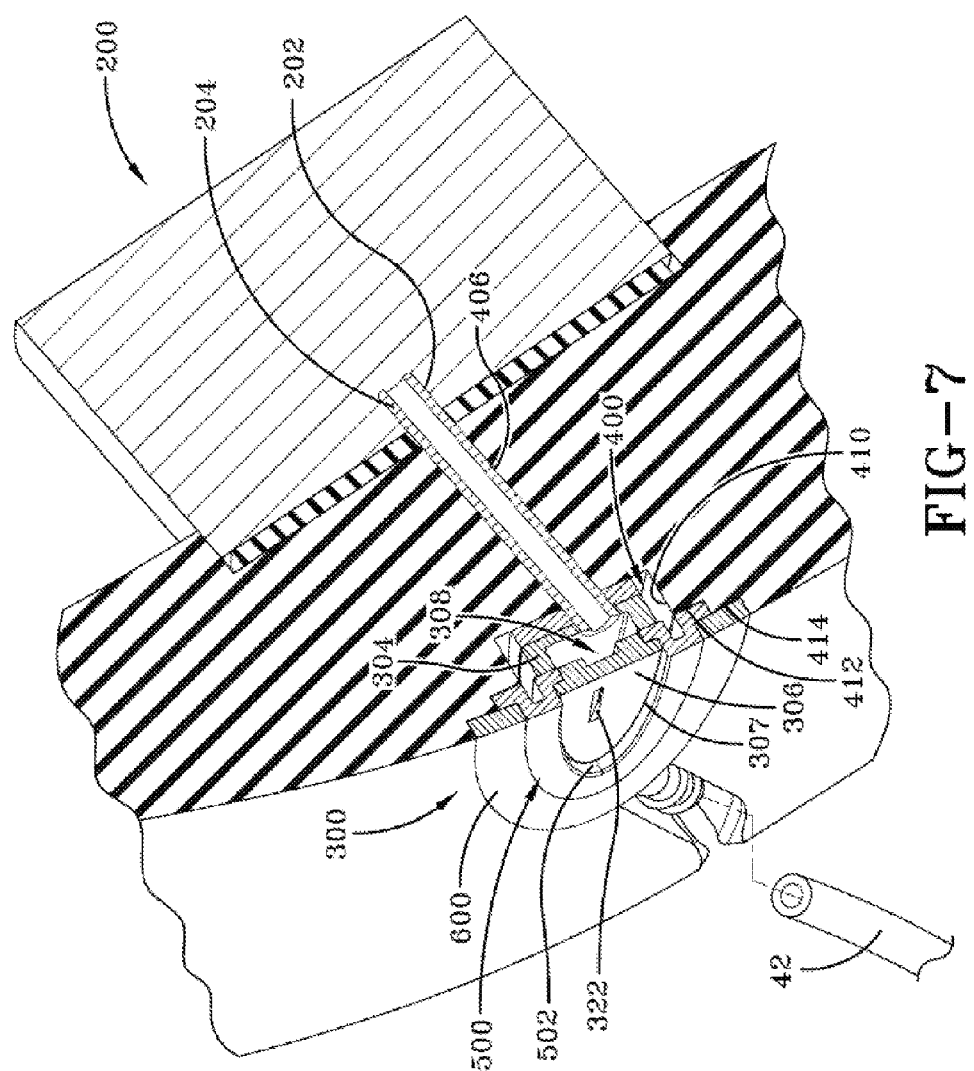
FIG. 7 is a cross-sectional view of the portion of the tire illustrating the filter assembly in the pocket of the tire bead area.
Figure 8:
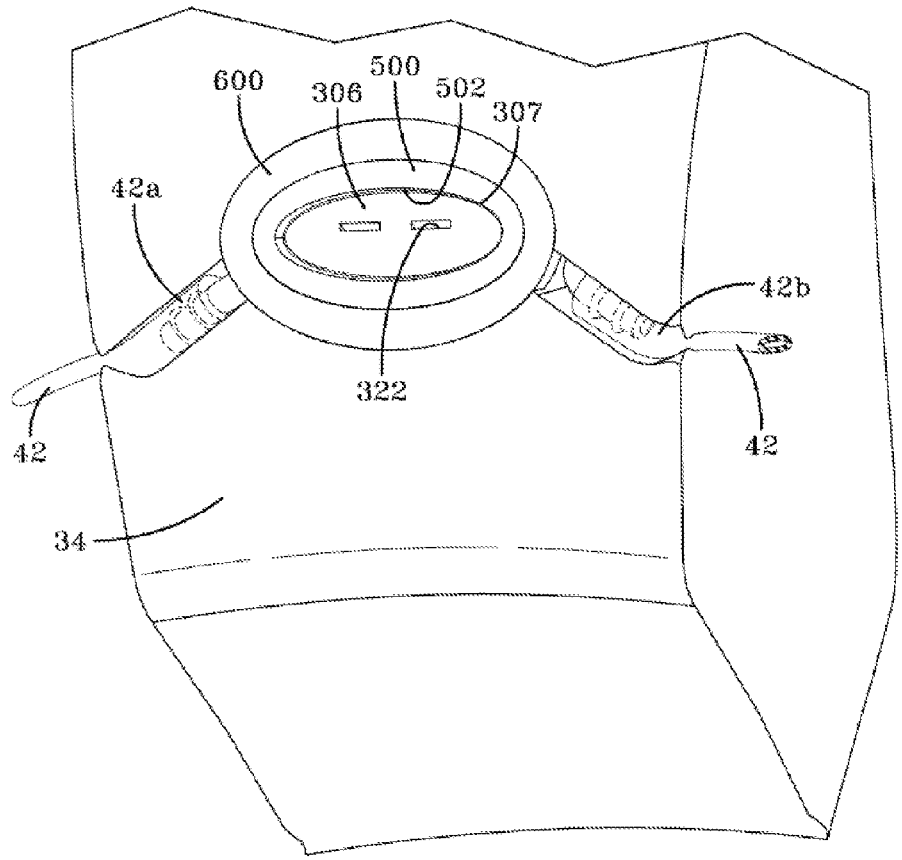
FIG. 8 is a front view of the filter assembly installed in the tire.
Figure 9:
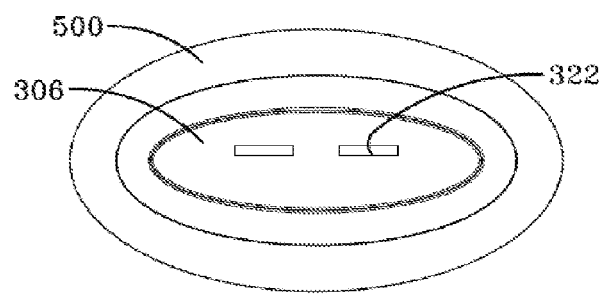
FIG. 9 is a front perspective view of the filter assembly.

The valve assembly 200 is preferably affixed to the inside of the tire, near the bead area. The valve assembly 200 has an inlet port 202 that is in fluid communication with a central air conduit 204. The central air conduit 204 is in fluid communication with an air filter assembly 300, as shown in FIGS. 6-8. The central air conduit is preferably a flexible tube or passageway that extends from a filter housing to the inlet port 202 of the valve assembly 200.

The valve assembly 200 is operable to control the amount of inlet air to the pump system 42. If the tire cavity pressure 40 falls below a set trigger pressure, the valve device allows air to enter the valve assembly 200 through inlet port 202, and then through to the pump passageway 42. The valve assembly 200 may allow airflow into the pump system through an air inlet port 202. The valve assembly 200 also may control the flow of air from the pump into the tire cavity, as well as prevent cavity air from back flowing into the pump passageways.

The air filter assembly 300 is preferably positioned on the outer sidewall of the tire, in the vicinity of the pump passageways, as shown in FIGS. 6-8. However, other locations may be used. The air filter assembly filters the outside air and communicates the filtered air to the inlet port 202 of the valve assembly 200. The air filter assembly 300 has a housing 304, and a cover 306 which assemble together to form an internal cavity 308. The filter housing 304 is shown in FIGS. 7, 10, 11 and 12. The filter housing 304 is also preferably elliptical in shape, with the minor axis aligned with the radial direction of the tire. The bottom surface 310 of the filter housing has a hole 312 for reception of a first end of the central air conduit 204. The filter housing has a sidewall 314 having cutouts 316. Tabular ends 320 of the cover 306 are received in the cutouts 316 to attach the cover to the filter housing. The front face of the cover has one or more holes 322. The filter housing 304 and cover 306 may be made of hard plastic or metal. One or more layers of filter media 550 is received in the internal cavity 308 of the filter assembly 300. The filter media may be a woven or nonwoven fiber, foam, spun fiberglass, charcoal, or other materials known to those skilled the art. Alternatively, a membrane such as PTFE GoreTex may be used, alone or in combination with the filter media.

Figure 4:
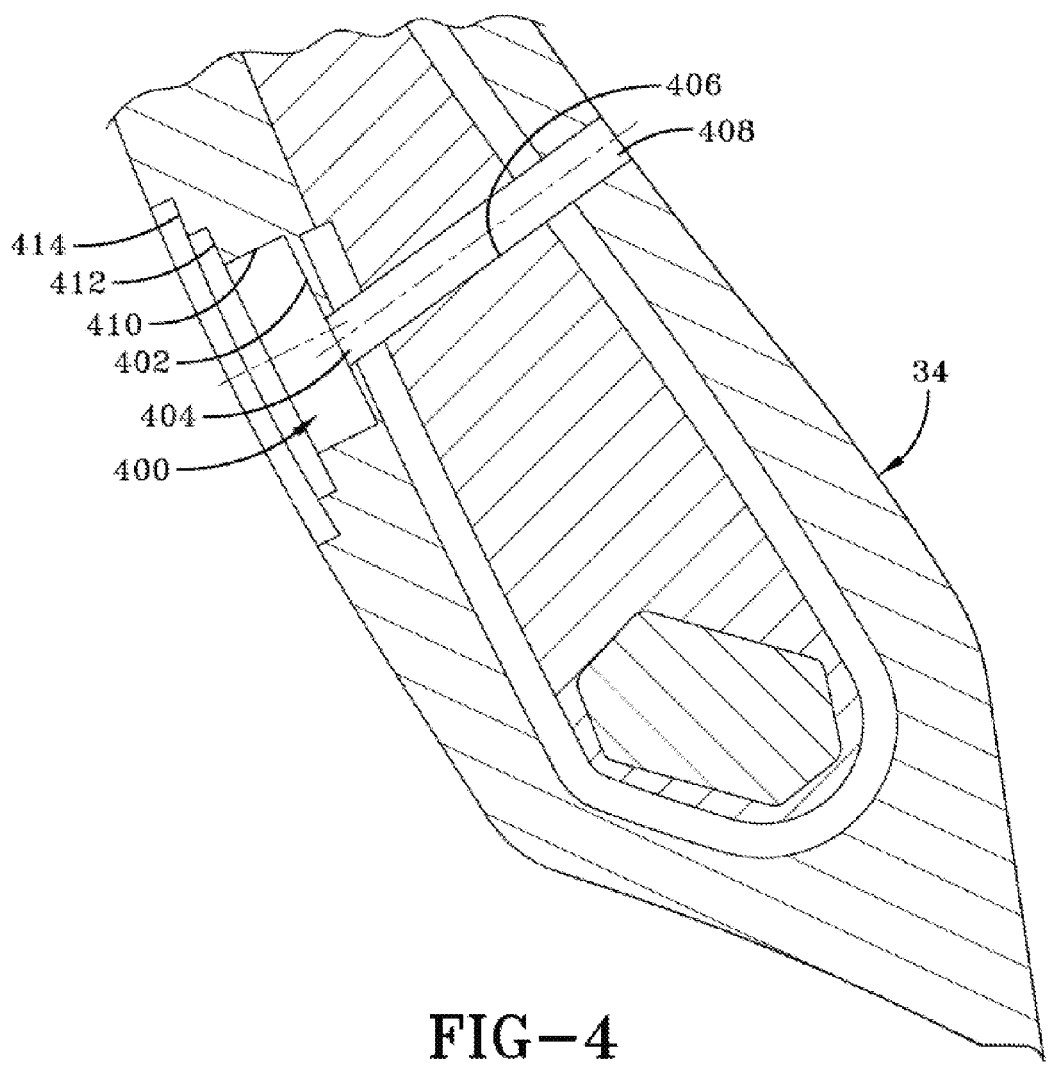
FIG. 4 is a close up cross-sectional view of the truck tire bead area illustrating a filter pocket.
Figure 5:
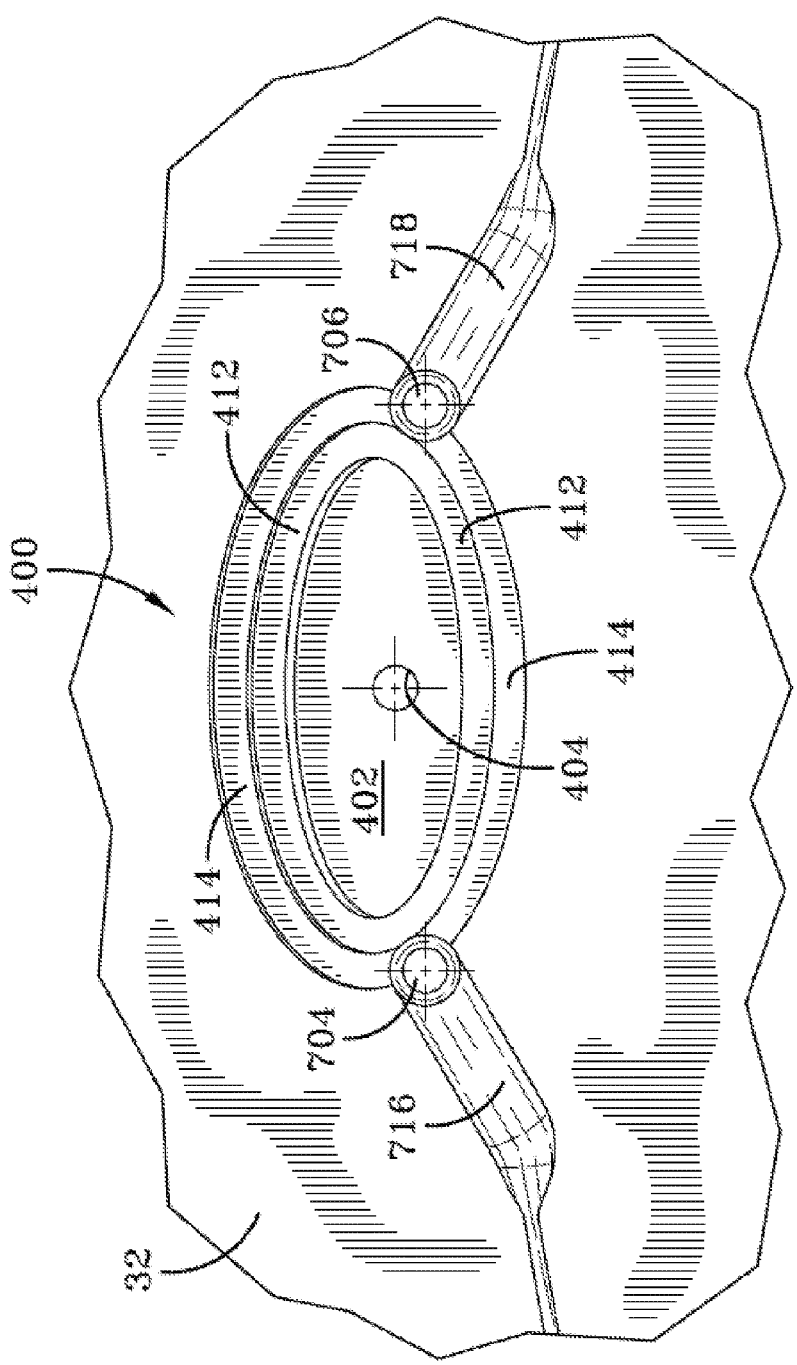
FIG. 5 is a front view of a filter pocket shown in the bead area of the tire.

The air filter assembly 300 is mounted in a pocket 400 formed on the outer surface of the tire, typically in the sidewall area near the pump passageways. The pocket 400 is shown in FIGS. 4-6. The pocket may be molded in the tire (not shown), or formed in a vulcanized tire, post cure by laser cutting.

As shown in FIG. 5, the general shape of the pocket 400 is curved, with no corners to eliminate stress concentrations. It is preferred that the pocket is also elliptical in shape, with the minor axis of the ellipse aligned with the radial direction of the tire. The pocket may also be round. The depth of the pocket is about 5-15 mm, and the major axis width is about 20-40 mm, minor axis width is about 8-15 mm. The pocket has a bottom surface 402 having a hole 404 that is connected to the passageway 406 formed through the tire to the tire cavity, so that fluid may communicate from the hole 404 in the pocket to the passageway exit 408. An optional central air conduit 204 is positioned in the passageway 406 to communicate filtered air to the valve assembly 200. Alternatively, the passageway 406 may be used to communicate fluid to the cavity from the pocket.

Figure 10:
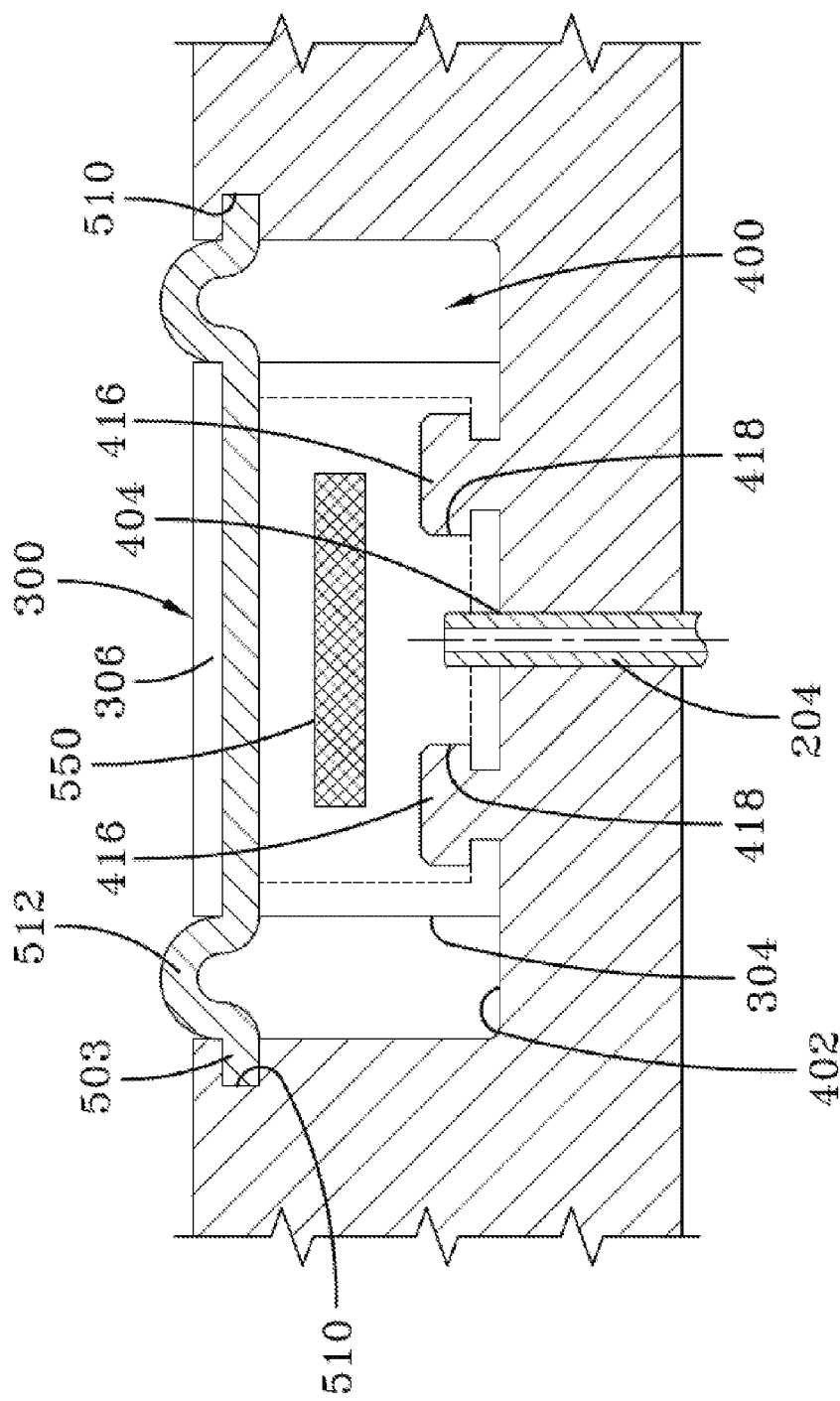
FIG. 10 is a side cross-sectional view of the filter assembly.
Figure 11:
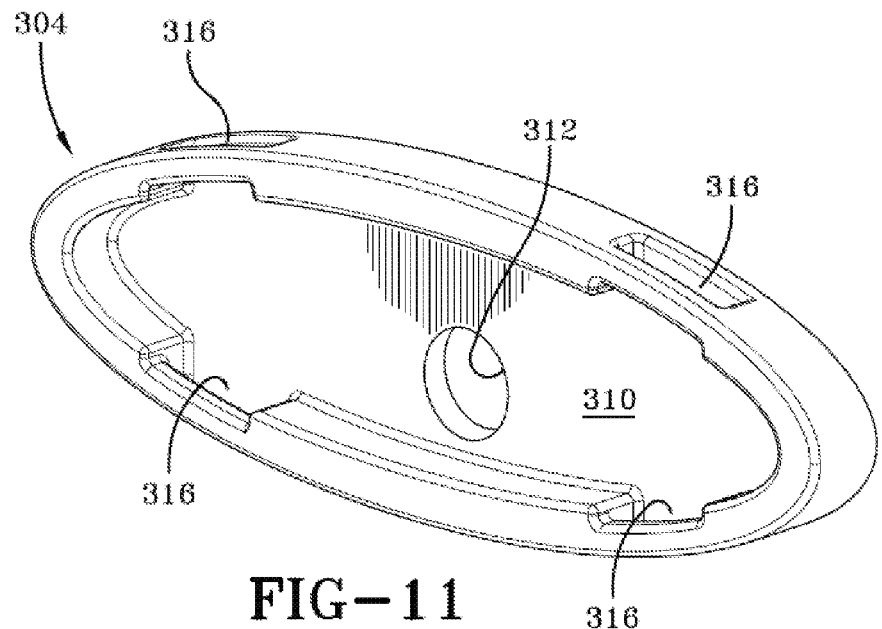
FIG. 11 is a perspective view of the filter housing.
Figure 12:
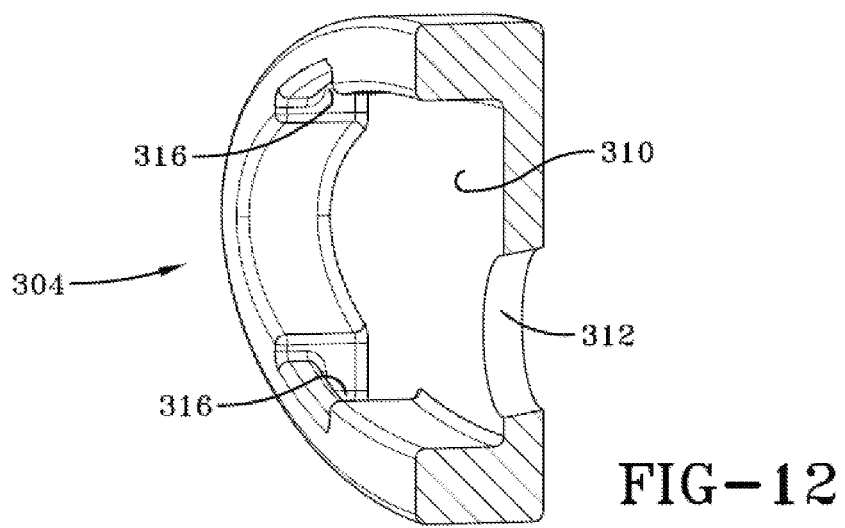
FIG. 12 is a cut away view of the filter housing.

The bottom surface 402 of the pocket may further optionally include molded in attachment knobs 416 as shown in FIG. 10. The attachment knobs 416 may be used to secure a filter housing to the pocket. The bottom of the filter housing may have recesses 418 which allow the knobs 416 to snap inside, as shown in FIG. 10. Alternatively, the filter housing may have knobs (not shown) which are secured into recesses of the pocket (not shown).

The pocket 400 further includes a sidewall 410. The sidewall 410 is surrounded by a first and second ledge 412, 414 joined together. A flexible collar 500 has an interior hole 502 wherein the interior hole is positioned around the outer circumferential edge 307 of the cover 306. The flexible collar 500 has a second end 503 positioned on the first ledge 412. Alternatively, the second end may be positioned in a slot 510 formed in the sidewall of the pocket, as shown in FIG. 10. The cross-sectional profile 512 of the flexible collar may be U shaped. The flexible collar allows for the +/−10% sidewall strain seen in tire service while protecting the filter media from flexing. The flexible collar 500 is made from a flexible material such as rubber.

A green (unvulcanized) rubber ring 600 has an inner hole that is positioned about the outer circumference of the flexible collar 500 and wherein the outer portion of the rubber ring is positioned on the second, outer ledge 414. The green rubber ring 600 has an inner side which is coated with a suitable adhesive as described below. The green rubber ring 600 is then cured over the flexible collar and affixed to the sidewall of the tire. The green rubber ring 600 may be cured by heat.

As shown in FIGS. 7 and 10, the filter housing major axis dimension and minor axis dimension is smaller than the pocket internal cavity 308, such that there is a gap surrounding the filter housing. The spatial gap can be in the range of 2 mm to about 8 mm. Thus the filter housing major axis dimension may be in the range of 10% to 50% smaller than the pocket major axis dimension, and more preferably, 20-30% smaller than the pocket major axis dimension.

The bottom of the filter housing is attached to the pocket bottom surface 402 by using one or more strips of green unvulcanized rubber which are coated with a suitable adhesive on both sides. The adhesive may be heat cured or cured at room temperature. One suitable adhesive is Fast Dry Self-vulcanizing Cement made by the Rubber Patch Company.

Adjacent the pocket are two holes 704, 706 as shown in FIGS. 5 and 6. The holes 704, 706 extend through the sidewall of the tire and are in fluid communication with aligned holes 708, 710 of the regulator 203. Pump tubes 702, 703 have a first end 705, 707 that are inserted through holes 704, 706 and into regulator holes 708, 710. Pump tubes 702, 703 preferably have quick connect ends such as barbs, etc so that the system may be easily assembly. Pump tubes have a second end 712, 714 that are bent about 90°. The second ends 712, 714 are inserted into slots 716, 718 formed adjacent the pocket. The second ends 712, 714 of the pump tubes connect to a continuous pump passageway 42.

The pump passageway is connected to the second ends of the pump tubes, and then the pump passageway is inserted into channel 44. Preferably, the pump passageway is coated with rubber cement and then inserted into the pump passageway. A green cover strip of rubber having an inner surface is first coated with rubber cement and then is placed over the pump passageway in the annular channel. Heat may be used to cure the rubber cement.

When in use and the tire rotates through the footprint at the interface between the tread and ground nearest the pump tubes and central air conduit, the air from the pump passageway is pushed through the pump tubes and central air conduit in the bead area while having the load of tire and vehicle pressing down on their opening. To maintain integrity of the pump tubes and central air conduit, the pump tubes and central air conduit are formed from a rubber composition having a shore D hardness of at least 40 as measured by ASTM-D2240. In one embodiment, the shore D hardness of the rubber composition is at least 45. In one embodiment, the shore D hardness of the rubber composition is at least 50.

The rubber composition includes at least one diene based rubber. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are natural rubber, synthetic polyisoprene, polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

In one embodiment, cis 1,4-polybutadiene rubber (BR) is used. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from −95 to −105° C. Suitable polybutadiene rubbers are available commercially, such as Budene® 1207 from Goodyear and the like.

In one embodiment, a synthetic or natural polyisoprene rubber may be used.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis* & *Testing of Petroleum and Related Products* and *British Standard* 2000 Parts, 2003, 62nd edition, published by the Institute of Petroleum, United Kingdom.

The rubber composition may include from about 10 to about 150 phr of silica. In another embodiment, from 20 to 120 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^{3/100}$ g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

Z-Alk-S$_n$-Alk-Z   I in which Z is selected from the group consisting of

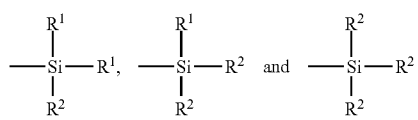

where R$^1$ is an alkyl group of 1 to 4 carbon atoms, cyclohexyl or phenyl; R$^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

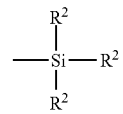

where R$^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

The rubber composition may contain an in-situ resin that is the reaction product of a methylene acceptor and a methylene donor.

In-situ resins are formed in the rubber composition and involve the reaction of a methylene acceptor and a methylene donor. The term "methylene donor" is intended to mean a chemical capable of reacting with a methylene acceptor and generate the resin in-situ. Examples of methylene donors which are suitable for use in the present invention include hexamethylenetetramine and N-substituted oxymethylmelamines, of the general formula:

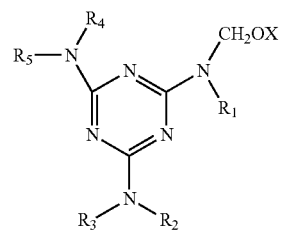

wherein X is hydrogen or an alkyl having from 1 to 8 carbon atoms, R$_1$'R$_2$, R$_3$, R$_4$ and R$_5$ are individually selected from the group consisting of hydrogen, an alkyl having from 1 to 8 carbon atoms, the group —CH$_2$OX or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine, N,N'N"-tributyl-N,N',N"-trimethylol-melamine, hexamethoxymethylmelamine, and hexaethoxymethylmelamine. The N-methylol derivatives of melamine are prepared by known methods.

The amount of methylene donor in the rubber composition may vary. In one embodiment, the amount of methylene donor ranges from 0.5 to 25 phr. In another embodiment, the amount of methylene donor ranges from 1 to 15 phr.

The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative compounds which may be used as a methylene acceptor include but are not limited to resorcinol, resorcinolic derivatives, monohydric phenols and their derivatives, dihydric phenols and their derivatives, polyhydric phenols and their derivatives, unmodified phenol novolak resins, modified phenol novolak resin, resorcinol novolak resins and mixtures thereof. Examples of methylene acceptors include but are not limited to those disclosed in U.S. Pat. No. 6,605,670; U.S. Pat. No. 6,541,551; U.S. Pat. No. 6,472,457; U.S. Pat. No. 5,945,500; U.S. Pat. No. 5,936,056; U.S. Pat. No. 5,688,871; U.S. Pat. No. 5,665,799; U.S. Pat. No. 5,504,127; U.S. Pat. No. 5,405,897; U.S. Pat. No. 5,244,725; U.S. Pat. No. 5,206,289; U.S. Pat. No. 5,194,513; U.S. Pat. No. 5,030,692; U.S. Pat. No. 4,889,481; U.S. Pat. No. 4,605,696; U.S. Pat. No. 4,436,853; and U.S. Pat. No. 4,092,455. Examples of modified phenol novolak resins include but are not limited to cashew nut oil modified phenol novolak resin, tall oil modified phenol novolak resin and alkyl modified phenol novolak resin.

Other examples of methylene acceptors include activated phenols by ring substitution and a cashew nut oil modified novalak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor in the rubber stock may vary. In one embodiment, the amount of methylene acceptor ranges from 0.5 to 25 phr. In another embodiment, the amount of methylene acceptor ranges from 1 to 15 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

To produce the passage tubes and central air passage from the rubber composition, the rubber composition may be formed into a tubular shape using methods as are known in the art, including extrusion and the like. In one embodiment, the passage tubes and central air passage may be formed with an outside diameter in cross section of 2 to 4 mm and a wall thickness of 0.5 to 1 mm.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

The invention is further illustrated by the following non-limiting examples.

Example 1

In this example the use of steel tubes for the pump tubes and central passage tube is illustrated.

Three steel tubes were inserted through a tire into the tire bead area in the location and in the configuration needed for the regulator attachment (see e.g. FIGS. 4,6). The tubes were flush with the liner side of the tire and the passages were sealed with a tire repair patch on the inside of the tire. A bead durability test was run and the tire was removed from the test after the equivalent of 7566 miles.

The tires were tested in a bead durability test on 120" smooth steel drums. In this test, tires are run at constant speed, maintained inflation, zero slip and camber, while the load is increased by a fixed amount at regular intervals (typically 5% of nominal load every 1200 km).

The tire was analyzed after the equivalent of 7566 miles on the test. The steel tubes had broken at or near the ply ending. Samples showed torsion and ductile fatigue. Some sections had surface cracking.

Example 2

In this example the use of polyurethane tubes for the pump tubes and central passage tube is illustrated.

Two tires were prepared and tested as in Example 1, except that polyurethane tubing was used.

Polyurethane tubing was tested in two tires for higher or lower positioning of the passages in reference to the pumping groove and ply ending. Two sets of tubes were placed in each tire, with the sets of tubes in a given tire separated by 180° around the tire. The tires ran 3775 and 1502 miles on the durability test before being removed.

In some samples melting of the polyurethane tube could be observed.

Example 3

In this example the use of teflon tubes for the pump tubes and central passage tube is illustrated.

A tire were prepared and tested as in Example 1, except that teflon tubing was used.

The tire was analyzed after the equivalent of 7694 miles on the test. The tubes looked intact in the tire section but were found to have kinks, indentations, and gouges. One of the three tubes was penetrated by a cut wire end. Black debris was found in the tubes and they were blocked.

Example 4

In this example the use of rubber tubes for the pump tubes and central passage tube is illustrated. Rubber tubing was constructed from calendered sheet using two standard apex rubber compositions having a Shore D hardness of 50 and 30.

Calendered rubber sheet was brushed with Nylabond III cement for better tack. The rubber was wrapped over a metal pin three times and the assembly was placed in a mold. Five assemblies fit into the mold. The rubber was cured 10 minutes at 170° C.

Rubber passage tubes made out of the high hardness and lower hardness materials were installed into two fully functional air maintenance tires. The tubes made out of the lower hardness rubber did not have air flow when installed in a tire. The higher hardness rubber tubes have flow when the tire is mounted and inflated.

Example 5

In this example the use of extruded rubber tubes for the pump tubes and central passage tube is illustrated.

The higher hardness rubber compound (Shore D=50) of Example 4 was extruded into rubber tubes having an inside diameter of 1.6 and an outside diameter of 3.1 mm. A tire was prepared and tested following the procedure of Example 1.

The tire was ODR tested to completion (89,809 miles). The ODR (outdoor resiliometer) test is an endurance test conducted on 67" smooth steel drums located outdoors to evaluate the impact of outdoor conditions on tire durability. Tires are run at constant load, constant speed, raised inflation, zero slip and zero camber. Tests are in principle run until the daily visual inspection reveals any of various standard causes for removal. Forensic analysis showed slightly elongated (oval), open tubes. All were rigid and intact.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire assembly comprising:
    a tire having a tread portion and a pair of sidewalls extending radially inward from the tread portion to join with a respective bead; a supporting carcass for the tread portion and sidewalls;
    a pump passageway positioned within a bending region of the tire, the pump passageway being operative to open and close as the tire rotates;
    a valve assembly in fluid communication with the pump passageway;
    a pocket formed in the tire;

a filter assembly mounted in the pocket, said filter assembly being in air flow communication with the valve assembly, wherein the pocket has an area larger than the area of the filter assembly;

wherein the valve assembly has an inlet, wherein the filter assembly has an outlet, wherein a tube connects the filter assembly outlet to the inlet of the valve assembly;

wherein the tube is made of a rubber composition having a shore D hardness greater than 40 as measured by ASTM-D2240.

2. The tire assembly of claim 1 wherein the area of the pocket is 10-30% larger than the area of the filter housing.

3. The tire assembly of claim 1 wherein the filter assembly has the shape of an ellipse.

4. The tire assembly of claim 3 wherein the ellipse has a major axis and a minor axis, wherein the minor axis of the filter assembly is aligned with the radial direction of the tire.

5. The tire assembly of claim 1 wherein the pocket is formed in the sidewall of the tire.

6. The tire assembly of claim 5 wherein the pocket is elliptical in shape, and having a minor axis aligned with the radial direction of the tire.

7. The tire assembly of claim 1 wherein the pocket has a bottom surface, wherein the bottom surface has a hole connected to a channel formed in the tire wall, wherein the hole is in fluid communication with the valve assembly through the channel.

8. The tire assembly of claim 1 wherein the rubber composition has a Shore D hardness greater than 45.

9. The tire assembly of claim 1 wherein the rubber composition has a Shore D hardness greater than 50.

10. The tire assembly of claim 1 wherein the tube has barbs on each end for a quick connection.

11. The tire assembly of claim 1 wherein the tube has quick connects on each end.

12. The tire assembly of claim 1 wherein the tube has pressure fittings on each end for a quick connection.

13. The tire assembly of claim 1 wherein the filter assembly is formed of a housing and a cover, wherein the cover has one or more holes for communicating air with the housing, wherein the cover is connected to the housing, the housing having an interior cavity for receiving a filter media, the housing having a hole for fluid communication with the valve assembly, wherein a flexible collar surrounds the cover.

14. The tire assembly of claim 13 wherein the flexible collar is made of rubber.

15. The tire assembly of claim 13 wherein the cross-sectional shape of the collar is U-shaped.

16. A tire assembly comprising:
a tire having a tread portion and a pair of sidewalls extending radially inward from the tread portion to join with a respective bead; a supporting carcass for the tread portion and sidewalls;
a pump passageway positioned within a bending region of the tire, the pump passageway being operative to open and close as the tire rotates;
a valve assembly in fluid communication with the pump passageway;
an elliptical pocket formed in the tire, wherein the pocket minor axis is aligned with the radial direction of the tire;
a filter assembly mounted in the pocket, said filter assembly being in air flow communication with the valve assembly, wherein the filter assembly is elliptical in shape;
wherein the valve assembly has an inlet, wherein the filter assembly has an outlet, wherein a tube connects the filter assembly outlet to the inlet of the valve assembly;
wherein the tube is made of a rubber composition having a shore D hardness greater than 40 as measured by ASTM-D2240.

17. A tire assembly comprising:
a tire having a tread portion and a pair of sidewalls extending radially inward from the tread portion to join with a respective bead; a supporting carcass for the tread portion and sidewalls;
a pump passageway positioned within a bending region of the tire, the pump passageway being operative to open and close as the tire rotates;
a valve assembly in fluid communication with the pump passageway;
a pocket formed in the tire,
a filter assembly mounted in the pocket, said filter assembly being in air flow communication with the valve assembly, wherein the filter assembly is formed of a housing and a cover, wherein the cover has one or more holes for communicating air into the housing, wherein the cover is connected to the housing, the housing having an interior cavity having a filter media housed therein, the housing having a hole in fluid communication with the valve assembly, wherein a flexible collar surrounds the cover;
wherein the valve assembly has an inlet, wherein the filter assembly has an outlet, wherein a tube connects the filter assembly outlet to the inlet of the valve assembly;
wherein the tube is made of a rubber composition having a shore D hardness greater than 40 as measured by ASTM-D2240.

* * * * *